United States Patent [19]

Allison

[11] 4,379,663

[45] Apr. 12, 1983

[54] VACUUM SEQUENCING SYSTEM WITH WEIGHT CONTROLLED MATERIAL DRAW CYCLE

[75] Inventor: Robert Allison, Sabetha, Kans.

[73] Assignee: Mac Equipment, Inc., Sabetha, Kans.

[21] Appl. No.: 189,673

[22] Filed: Sep. 22, 1980

[51] Int. Cl.³ .............................................. B65G 53/66
[52] U.S. Cl. ........................................ 406/23; 406/28; 406/170; 222/56; 222/55; 222/134; 222/136
[58] Field of Search ................... 222/1, 14, 16, 52, 53, 222/55, 58, 64, 65, 77, 129, 134, 135, 136, 152, 394, 205, 56; 406/10, 12, 19, 23, 33, 170, 28

[56] References Cited

U.S. PATENT DOCUMENTS

| | | | |
|---|---|---|---|
| 3,309,146 | 3/1967 | Russell | 222/134 X |
| 3,844,446 | 10/1974 | Solt | 406/33 |
| 3,944,118 | 3/1976 | Trill | 222/205 X |
| 3,989,308 | 11/1976 | Zimmermann et al. | 406/23 |

OTHER PUBLICATIONS

"Dillon Force Control Switch", Catalog J1-5, May 1974.

Primary Examiner—Charles A. Marmor
Attorney, Agent, or Firm—Kokjer, Kircher, Bradley, Wharton, Bowman & Johnson

[57] ABSTRACT

A weight sensitive arrangement for controlling the material draw cycle of a vacuum sequencing system based on the weight of material delivered to a pellet receiver included in the system. The material is drawn by a vacuum into the receiver under the control of a dump valve. The receiver deflects downwardly when loaded and is equipped with a U-shaped deflection beam having an upper arm that deflects in proportion to the receiver deflection. A screw carried on the upper arm of the beam contacts a microswitch when the receiver is loaded to a preselected weight. The microswitch then activates the dump valve to interrupt the vacuum, thereby terminating the material draw cycle and effecting discharge of the batch of material in the pellet receiver.

10 Claims, 4 Drawing Figures

VACUUM SEQUENCING SYSTEM WITH WEIGHT CONTROLLED MATERIAL DRAW CYCLE

BACKGROUND AND SUMMARY OF THE INVENTION

This invention relates in general to vacuum sequencing equipment and deals more particularly with a weight sensitive system for controlling the material draw cycle of pellet receivers and the like.

Vacuum sequencing systems are widely used in the plastics industry and in other industries to supply various types of materials to hoppers and to other equipment. A typical application in the plastics industry is in connection with extrusion machines. The vacuum sequencing system includes a plurality of hoppers which serve as receivers for the plastic pellets or powders that are supplied in batches to the extrusion machines. A conduit extends to each hopper from a storage silo, and a vacuum blower applies a vacuum to the hopper in order to draw the pellets through the conduit and into the hopper during the draw cycle of the system. When the hopper has been loaded sufficiently, a dump valve is activated to break the vacuum, thereby terminating the flow of material and effecting discharge of the hopper contents to the extrusion machine.

At present, the material draw cycle of each hopper is normally controlled on a time basis. Each hopper is equipped with a timing device which opens the dump valve after a preset time has elapsed following initiation of the draw cycle. Although control of the material draw cycle by this type of timing system has worked well for the most part, it has not been wholly free of problems. For example, if the hopper has been drawing from a silo which is relatively remote and it is desired to begin drawing from a closer storage box or bin, the timer must be changed to a shorter cycle in order to prevent possible overfill of the hopper. Conversely, if the change is made from a relatively close storage bin to a more distant one, the hopper will not be adequately loaded unless the time is adjusted to operate on a longer cycle. The timing devices also add to the cost involved and result in considerable inconvenience since they must be reset from time to time.

It is the primary object of the present invention to provide, in a vacuum sequencing system, an improved method and control arrangement for accurately controlling the material draw cycle of a receiver based on the weight of material in the receiver. The weight sensitive control arrangement eliminates the need for timing devices and the need to reset the timers each time the conveying distance is changed.

Another object of the invention is to provide a method and control arrangement of the character described wherein the weight of material delivered to the receiver during each draw cycle can be easily and accurately adjusted.

A further object of the invention is to provide a method and control arrangement of the character described which is well adapted to control a ratio valve in a manner to permit accurately controlled quantities of two materials to be loaded into the receiver. This increases the versatility of the system in that it allows the receiver to be used as a ratio proportioner or ratio blender.

An additional object of the invention is to provide a control arrangement of the character described which operates reliably and with repeatable accuracy and which permits the amount of material used by each receiver to be easily determined. In the latter regard, a batch counter is all that is necessary to measure the material use since the weight of each batch is identical.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith and in which like reference numerals are used to indicate like parts in the various views.

Figure 1:
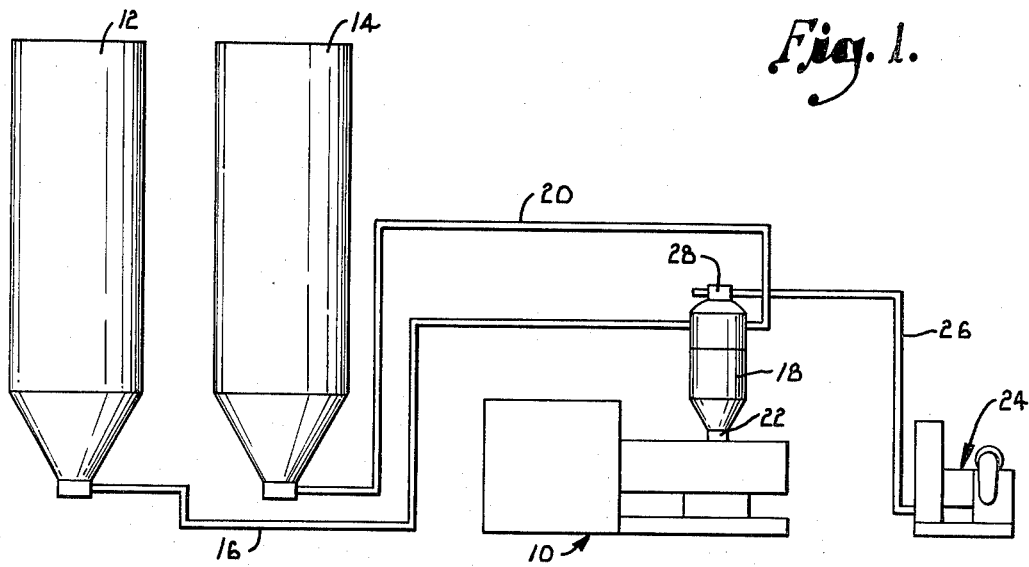
FIG. 1 is a diagrammatic view illustrating one of the extrusion machines and associated hoppers included in a vacuum sequencing system which is equipped with the weight sensitive control arrangement of the present invention.

FIG. 1 illustrates diagrammatically a vacuum sequencing system of the type used to supply plastic pellets and the like to an extrusion machine 10. The vacuum sequencing system includes a pair of storage silos 12 and 14 in which two different types of plastic pellets or other diverse materials are stored. A conduit 16 leads from the outlet of silo 12 to one inlet of a hopper 18 which serves as a receiver for the plastic pellets or other materials which are to be delivered to the extrusion machine 10. The second silo 14 has a similar conduit 20 leading from its outlet to a second inlet of hopper 18. Hopper 18 has an outlet 22 at the bottom which is equipped with a flop gate (not shown) and which delivers the plastic pellets in batches to the extrusion machine.

The flow of material into hopper 18 is effected by a conventional vacuum blower 24 which applies a vacuum to the hopper. A conduit 26 leads from the vacuum blower 24 to a dump valve 28 mounted on top of the hopper. As will be explained more fully, the vacuum blower applies a vacuum to the hopper which results in material being drawn into the hopper from the storage bins. The dump valve 28 operates to interrupt the vacuum, thereby terminating the draw cycle of the hopper and effecting discharge of the pellets from the hopper into the extrusion machine 10. In actual practice, the vacuum sequencing system normally includes a number of extrusion machines, each equipped with a hopper.

Figure 2:
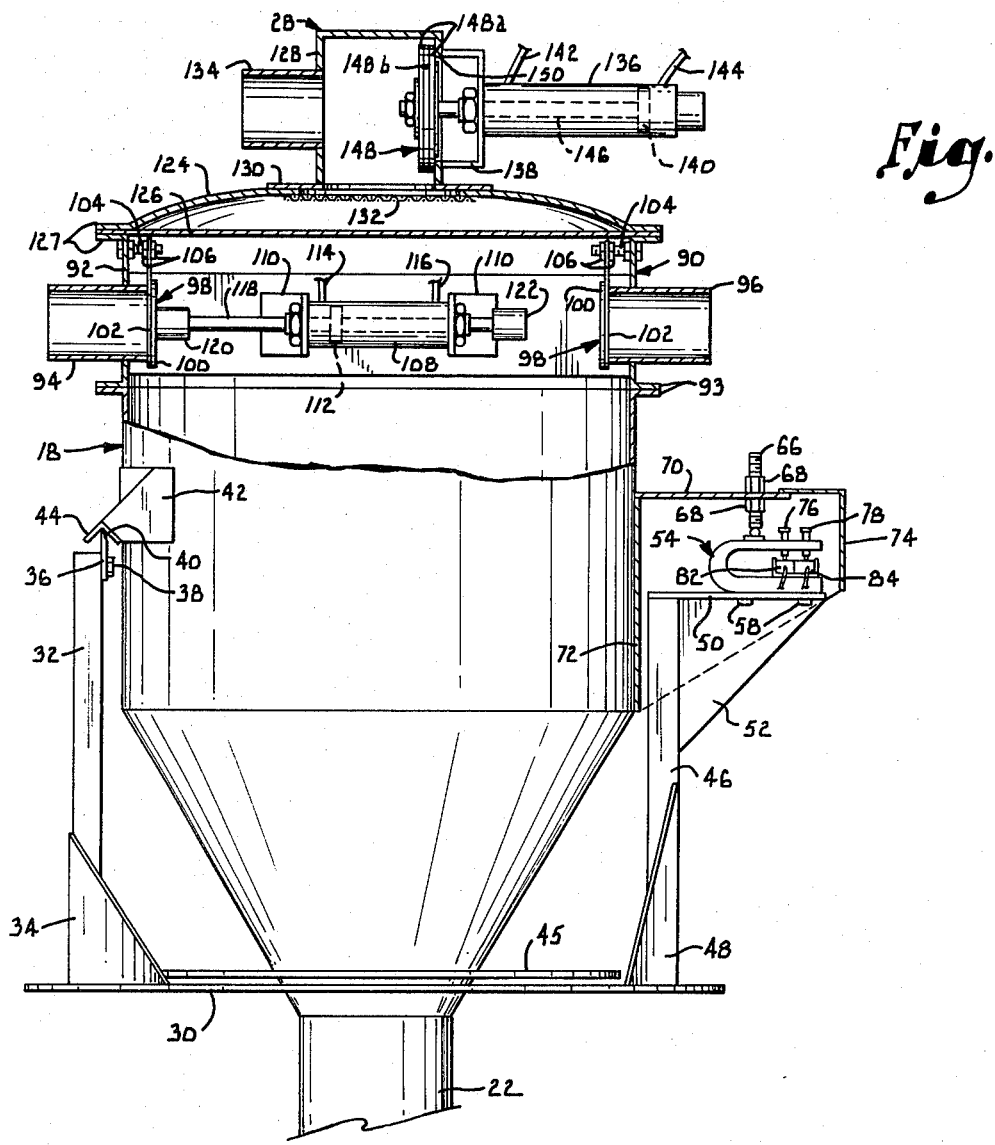
FIG. 2 is a fragmentary elevational view on an enlarged scale of the hopper, with portions broken away for purposes of illustration.

Referring now more particularly to FIG. 2, each hopper 18 in the vacuum sequencing system is supported on a frame which includes a flat, circular base plate 30. Extending upwardly from plate 30 is a vertical post 32 which is reinforced by a pair of gusset plates 34. A metal bar 36 is secured to the upper end of post 32 by a pair of bolts 38. The top edge of bar 36 is horizontal and is beveled to provide a relatively sharp knife edge 40.

A bracket 42 is secured to the side wall of hopper 18 and carries an angle member 44 outwardly of the hopper wall. The angle member 44 is oriented such that the open area presented between its two flanges faces downwardly, and the crotch of the angle is positioned on the knife edge 40. Consequently, hopper 18 is mounted on the frame in a manner permitting the hopper to pivot downwardly about the horizontal axis of knife edge 40 when the hopper is loaded with plastic pellets or other material. A flange 45 is carried on the lower portion of the hopper and engages plate 30 to prevent excessive downward deflection of the hopper.

The frame includes a second vertical post 46 which extends upwardly from plate 30 at a location substantially diametrically opposite from post 32. A pair of gusset plates 48 reinforces the connection between post 46 and plate 30. A horizontal plate 50 is welded or otherwise secured to the top end of post 46, with a gusset plate 52 strengthening the connection. Mounted on plate 50 is a U-shaped steel deflection beam which is generally designated by numeral 54.

Figure 3:
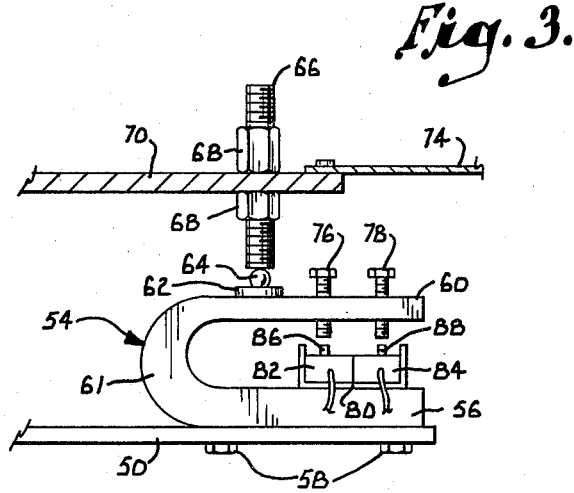
FIG. 3 is an enlarged fragmentary view of the force switch which is included in the control arrangement.

As best shown in FIG. 3, the deflection beam 54 has a relatively thick lower arm 56 which is bolted on top of plate 50 by a pair of bolts 58. Beam 54 has a thinner upper arm 60 which extends above the lower arm 56 and is connected thereto by a curved bight portion 61 of the beam. A polished cup 62 is mounted on top of arm 60 and receives a ball 64.

The loads which are applied to hopper 18 are transmitted to beam 54 through a leveling adjustment screw 66. Screw 66 engages the top of ball 64 and is secured by a pair of nuts 68 to a flat horizontal plate 70 which extends outwardly from hopper 18 at a location diametrically opposed to angle member 44. Plate 70 is secured to the upper edge of a curved plate 72 (FIG. 2) which is bolted or otherwise secured to the side wall of hopper 18. A dust cover 74 serves to completely enclose the deflection beam 54 and the associated components.

The loads which are applied to hopper 18 are transmitted to the upper arm 60 of the deflection beam through the screw 66 and ball 64. The rotation of ball 64 in the polished cup 62 assures that the force which is applied to the beam remains in a straight line at all times. The point of contact between screw 66 and ball 64 is at the same elevation as the contact between knife edge 40 and angle member 44. Nuts 68 can be loosened and screw 66 can be adjusted up or down to assure that hopper 18 is in a level condition. When hopper 18 is loaded with material, a moment force is applied to it about knife edge 40 and the hopper deflects downwardly about the knife edge in direct proportion to the weight of material in the hopper. Deflection of the hopper in turn effects proportional deflection of arm 60 of the deflection beam.

Referring now to FIG. 3 in particular, arm 60 carries a pair of finely threaded screws 76 and 78 which are threaded through the arm and which can be adjusted as to the distance they project below the upper arm of the deflection beam. Each screw is preferably formed of stainless steel. Mounted on the lower arm 56 is a bracket 80 which carries a pair of microswitches 82 and 84. Switch 82 has a contact 86 which is normally spaced below the tip of screw 76 but which is engaged by the screw when arm 60 is deflected sufficiently. Similarly, a contact element 88 of microswitch 84 is normally spaced below the tip of screw 78 but is engaged by the screw upon sufficient downward deflection of arm 60. The tips of screws 76 and 78 are preferably equipped with spring-loaded plungers which retract upon accidental overload to avoid damaging the microswitches.

Referring again to FIG. 2, the upper end of hopper 18 carries a ratio valve 90 which controls the relative amounts of materials that are delivered to the hopper from silos 12 and 14. The ratio valve 90 has a circular housing 92 which is mounted on top of hopper 18, as by bolting together flanges 93 of the hopper body and valve housing. A pair of diametrically opposed inlet fittings 94 and 96 extend into the ratio valve housing and connect with the respective conduits 16 and 20 which deliver plastic pellets to the hopper. The open inner end of each fitting 94 and 96 is engaged by a flapper 98 in the form of a metal disc 100 secured to a flexible rubber seal element 102. The upper end of each seal element 102 is mounted on a bolt 104 extending from the housing 92. A pair of nuts 106 secure each seal element on its bolt 104.

The flappers 98 are controlled by a pneumatic cylinder 108 which is carried by a pair of brackets 110 mounted to housing 92. Cylinder 108 has an internal piston 112 and air lines 114 and 116 which lead to opposite sides of the piston. Secured to piston 112 is a rod 118 which extends in sealed fashion through the opposite ends of the cylinder 108. Bumpers 120 and 122 are carried on opposite ends of rod 118.

When air is applied to cylinder 108 through line 116 and exhausted through line 114, piston 112 is forced to the left to the position shown in FIG. 2 wherein bumper 120 engages the metal disc 100 of the flapper which is adjacent fitting 94. The force which is thereby applied to the flapper holds seal element 102 in sealing position against fitting 94 such that material from bin 12 cannot pass into the hopper through line 16. However, the other bumper 122 is spaced well inwardly of the other flapper 98 such that material can flow from silo 14 through line 20 and into the hopper through inlet fitting 96. The flexibility of the seal element 102 permits the flapper to move away from the open inner end of fitting 96 when material is drawn into the hopper. When air pressure is applied through line 114 and exhausted through line 116, piston 112 is forced to the right and bumper 122 then holds flapper 98 tightly against the end of fitting 96. Bumper 120 is spaced from the other flapper to permit entry of material through fitting 94, thereby admitting the material from silo 12. The flow of air to and from cylinder 108 is controlled by a ratio valve solenoid which will subsequently be described.

A cover 124 is fitted on top of the ratio valve 90. A filter cloth 126 is secured between flanges 127 of the ratio valve 90 and cover 124 such that the filter cloth completely covers the top of the ratio valve. The dump valve 28 is mounted on top of cover 124.

A hollow box-like body 128 of the dump valve is mounted on a base plate 130 which is secured to cover 124. Body 128 is open at the bottom and communicates with the interior of cover 124 through a mesh screen 132. The dump valve 128 has a tubular fitting 134 which connects with the conduit 26 leading from the vacuum blower 24.

Dump valve 28 is activated by a pneumatic cylinder 136 which is mounted to a bracket 138 secured to the side of the valve body opposite fitting 134. Cylinder 136 has a piston 140 and a pair of lines 142 and 144 leading to opposite sides of the piston. A piston rod 146 extends from piston 140 through the end of the cylinder and into the interior of the valve body. A sealing disc 148 is carried on rod 146 at a location within the valve body. The sealing disc includes a pair of rubber seal elements 148a which sandwich a metal disc 148b.

When air is applied through line 142 and exhausted through line 144, piston 140 is forced to the right to the position of FIG. 2 wherein disc 148 seals an opening 150 in the side of the valve body adjacent bracket 138. When air is applied through line 144 and exhausted through line 142, piston 140 is urged to the left such that the seal of disc 148 with opening 150 is broken, and a seal is effected with fitting 134. The interior of hopper 18 is then vented to atmosphere through opening 150 and the open sides of bracket 138. Removal of the vacuum causes the flow of material into hopper 18 to terminate and effects discharge of the batch of material in the hopper. Outlet 22 has a flop gate (not shown) which is opened by the weight of the material when the vacuum is removed and which closes again following the discharge. Cylinder 136 is controlled by a material draw solenoid which will subsequently be described.

Figure 4:
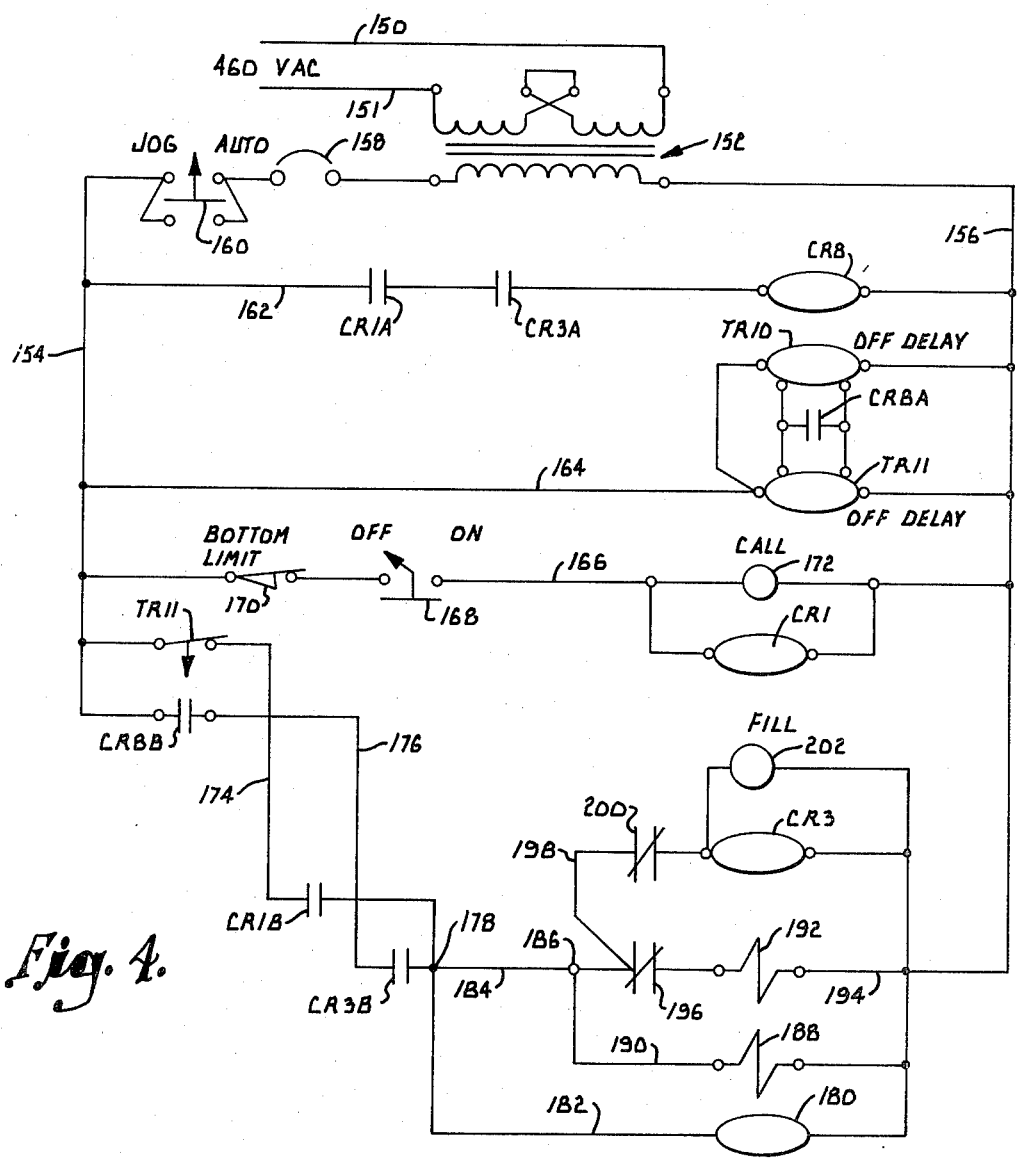
FIG. 4 is a schematic diagram of the electric circuit which controls the material draw cycle of the hopper.

FIG. 4 illustrates the electric circuit which controls the dump valve 28 and the ratio valve 90. The circuit includes lead lines 150 and 151 which may be connected with a power source. Connected between lines 150 and 151 is the primary side of the transformer 152. The secondary side of the transformer is connected between a pair of conductors 154 and 156. Line 154 is equipped with a fuse 158 and a manual switch 160.

A conductor 162 is connected across lines 154 and 156 and provided with a pair of normally open contacts CR1A and CR3A. A relay coil CR8 is also included in line 162. Another conductor 164 is connected between lines 154 and 156 in parallel with line 162. Included in line 164 is a relay coil TR11 which is arranged in parallel with another relay coil TR10 and also in parallel with a normally open set of relay contacts CR8A. Another line 166 is connected between lines 154 and 156. Line 166 is equipped with a manual off-on switch 168 and with a bottom limit switch 170 which opens when the flop gate (not shown) in the hopper outlet 22 is open. Switch 170 closes when the flop gate is closed. Line 166 has a bulb 172 which is in parallel with a relay coil CR1 which controls contacts CR1A.

A pair of conductors 174 and 176 extend in parallel relation to one another from line 154 to a node 178. Line 174 has a normally open relay contact TR11 which is controlled by a relay coil TR11 and which opens only after there has been a two second delay following deenergization of coil TR11. Line 174 also has a normally open set of relay contacts CR1B which are controlled by coil CR1. Line 176 has a set of normally open relay contacts CR8B which are controlled by coil CR8. Another set of normally open contacts CR3B are included in line 176.

A batch counter 180 is included in a conductor 182 which extends from node 178 to connection with line 156. Another line 184 extends between node 178 and another node 186. The material draw solenoid 188 which controls the dump valve 28 is included in a conductor 190 which extends from node 186 to conection with line 156. The ratio valve solenoid 192 which controls the operation of ratio valve 90 is included in a conductor 194 which is arranged in parallel with line 190. Line 194 also includes a set of normally closed contacts 196 which open when contact is made between screw 78 and the contacts 88 of microswitch 84. Another line 198 is arranged in parallel with lines 190 and 194 and is equipped with a relay coil CR3 which controls contacts CR3A and CR3B. A normally closed set of contacts 200 are included in line 198. Contacts 200 open when contact is made between the tip of screw 76 and the contact 86 of microswitch 82. A bulb 202 is wired in parallel with coil CR3.

In operation of the vacuum sequencing system, switch 160 is closed to supply power to the circuit and the material draw cycle of hopper 18 is initiated by closing the off-on switch 168. This completes the circuit through coil CR1 to effect closing of contacts CR1A and CR1B. Since contact TR11 is closed due to energization of coil TR11, closing of contacts CR1B results in completion of the circuits through the material draw solenoid 188 and the ratio valve solenoid 192. When the material draw solenoid is energized, it directs air into cylinder 136 through line 142 and exhausts air through line 144. As a result, piston 140 is forced to the position shown in FIG. 2 and opening 150 is sealed by the disc 148. The vacuum blower 24 then applies a vacuum to hopper 18 through line 26 and the fitting 134 of dump valve 28.

When the ratio valve solenoid 192 is energized, it effects a flow of air into cylinder 108 through line 116 and exhausts air through line 114. Piston 112 is thus forced to the position shown in FIG. 2 wherein fitting 94 is blocked and fitting 96 is open. The vacuum applied to the hopper causes material in silo 14 to be drawn into the hopper through line 20 and fitting 96.

The closing of contacts CR1B also completes the circuit through coil CR3 to effect closing of contacts CR3A and CR3B. Both sets of contacts CR1A and CR3A are then closed and coil CR8 is energized to effect closing of contacts CR8A and CR8B. When contact CR8A closes, coils TR10 and TR11 are deenergized such that contact TR11 opens after a two second delay. However, contacts CR8B and CR3B are now closed so that the circuits through solenoids 188 and 192 and coil CR3 remain completed. The delay in opening of contact TR11 assures that it will not open until contacts CR8B and CR3B are closed.

Hopper 18 is loaded with material from silo 14 until the weight of the material is sufficient to deflect the hopper downwardly about knife edge 40 far enough that the upper arm 60 of the deflection arm is displaced to the point that screw 78 engages the contact 88 of microswitch 84. At this point, contacts 196 open to effect deenergization of the ratio valve solenoid 192. When solenoid 192 is deenergized, air is directed into cylinder 108 through line 114 and is exhausted through line 116. Piston 112 is then forced to the right such that fitting 94 is opened. Since dump valve 28 remains in the closed condition, the vacuum which is applied to the hopper causes the material in silo 12 to be drawn through line 16 and into the hopper through fitting 94.

Loading of the hopper with the material in silo 12 continues until the weight of the material deflects arm 60 of the deflection beam sufficiently to effect engagement of screw 76 with the contact 86 of microswitch 82. At this time, contacts 200 open to interrupt the circuit through coil CR3. Contacts CR3B then open to interrupt the circuit to the material draw solenoid 188. When solenoid 188 is deenergized, it directs air into cylinder 136 through line 144 and exhausts air through line 142. This activates the dump valve by forcing piston 140 to the left to expose opening 150 to the atmosphere, thus breaking the vacuum applied to the hopper. The flow of material into the hopper is then terminated, and air can rush into the top of the hopper through opening 150 to effect discharge of the batch of material in the hopper to the extrusion machine 10. The flow of material through outlet 22 of the hopper opens the bottom limit switch 170 to break the circuit to coil CR1. During discharge of the material, coils CR1, CR3 and CR8 remain deenergized and their contacts remain open. Consequently, when contacts 196 and 200 close as material is discharged from the hopper, the material draw solenoid 188 and the ratio valve solenoid 192 remain deenergized.

Following completion of the discharge cycle, switch 170 closes to again energize coil CR1. Contacts CR1B then close and, since coil TR11 is energized to close contact TR11, the circuits to solenoids 188 and 192 are completed. Dump valve 28 is thus closed such that the vacuum is again applied to the hopper, and the piston rod 118 of the ratio valve cylinder is moved to the position of FIG. 2 wherein fitting 94 is closed and fitting 96 is open to receive material from silo 14 as another material draw cycle begins.

It is thus apparent that the vacuum sequencing system operates to deliver material from silo 14 to the hopper until a given weight of material has been loaded therein, at which time the hopper begins to receive material from silo 12. The hopper receives the material from silo 12 until it has been loaded to a weight sufficient to effect discharge of the material blend in the hopper. Screws 76 and 78 can be accurately adjusted such that they activate the microswitches at any desired load points. Consequently, any desired ratio of the material in silos 12 and 14 can be blended in the hopper. It is to be understood that the ratio valve 90 can be eliminated and in such a case, only a single screw and a single microswitch are provided. The material is delivered to the hopper from only one storage bin, and discharge is effected when the hopper has been loaded to the preselected weight level.

Since the dump valve and ratio valve are controlled by the weight of material in hopper 18, the hopper is never underfilled or overfilled, even if there is a change in the conveying distance between the storage bin or bins and the hopper. It has been found that the accuracy of the deflection beam 54 and microswitch arrangement is approximately one-half of one percent, while the repeatability is approximately one-fourth of one percent. The batch counter 180 is incremented by one batch each time a new material draw cycle is initiated, and the total material use can be easily calculated by multiplying the number of batches times the weight of each batch.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. In a vacuum sequencing system having first and second storage containers for holding granular plastic material and the like, a receiver for receiving the material from the containers and discharging the material in batches through an outlet of the receiver, first and second conduits extending from the respective first and second containers to the receiver to deliver the material therebetween, vacuum means for applying a vacuum to the receiver to draw the material through the conduits from the containers to the receiver, a ratio valve for opening and closing the first and second conduits to control the relative amounts of material loaded into the receiver from the first and second containers, and a dump valve operable when activated to interrupt the vacuum to thereby interrupt the material flow through the conduits and effect discharge of the material in the receiver through the outlet thereof, the improvement comprising:

a frame supporting the receiver in a manner permitting the receiver to deflect generally downwardly when material is loaded therein;

switch means for activating the dump valve when the downward deflection of the receiver reaches a first predetermined level, thereby effecting discharge of a batch of material from the receiver when the weight of the batch is sufficient to effect said first predetermined level of deflection of the receiver and second switch means sensitive to downward deflection of the receiver to a second predetermined level which is less than the first predetermined level, said second switch means being operable when deflection of the receiver is less than said second level to maintain the ratio valve in a first condition wherein the first conduit is open and the second conduit is closed, and when deflection of the receiver exceeds said second level to maintain the ratio valve in a second condition wherein the first conduit is closed and the second conduit is open, whereby material is loaded into the receiver from the first container when the deflection of the receiver is less than said second level and from the second container when the deflection of the receiver is between said second level and said first level.

2. The improvement set forth in claim 1, wherein said first switch means comprises:

a generally U-shaped deflection beam having a lower arm mounted on said frame and an upper arm located and arranged to deflect toward said lower arm in response to downward deflection of the receiver; and a microswitch operable to activate the dump valve when the deflection of said upper arm reaches a preselected level.

3. The improvement set forth in claim 2, including a switch actuator carried on said upper arm at a location to engage said microswitch when the deflection of said upper arm reaches said preselected level, said microswitch activating the dump valve when engaged by said switch actuator.

4. The improvement set forth in claim 3, including means for adjusting the position of said switch actuator on said upper arm to adjust the amount of deflection of said upper arm required to effect engagement of the switch activator with the microswitch, thereby adjusting the weight of each batch of material loaded into the receiver before discharge of the batch is effected.

5. The improvement set forth in claim 1, including a generally U-shaped deflection beam having a lower arm mounted on said frame and an upper arm disposed to receive the load applied to the receiver to deflect toward said lower arm upon downward deflection of the receiver, said first and second switch means controlling the dump valve and the condition of the ratio valve in accordance with the extent of deflection of said upper arm.

6. The improvement set forth in claim 5, wherein:
said first switch means includes a first microswitch on said lower arm and a first switch actuator on said upper arm, said first microswitch being engaged by said first actuator when the upper arm deflects to a first preselected level and being operable when engaged by said first actuator to activate the dump valve; and
said second switch means includes a second microswitch on said lower arm and a second switch actuator on said upper arm, said second microswitch being engaged by said second actuator when the upper arm deflects to a second preselected level less than said first level, said second microswitch being operable when engaged by said second actuator to effect the second condition of the ratio valve.

7. The improvement set forth in claim 6, including means for adjusting the spacing between said first microswitch and said first switch actuator and between said second microswitch and said second switch actuator when said upper arm is in an undeformed condition, thereby adjusting the amount of deflection of the upper arm required to effect engagement of the first and second actuators with the respective first and second microswitches.

8. In a vacuum sequencing system having first and second storage containers for holding different materials such as granular plastic materials and the like, a receiver having first and second inlets and an outlet, and first and second conduits extending from the respective first and second containers to the respective first and second inlets, a method of controlling the flow of material to the receiver and the discharge of material therefrom, comprising the steps of:
maintaining the first inlet open and the second inlet closed;
applying a vacuum to the receiver to draw material from the first container into the receiver, with the vacuum holding the material in the receiver;
closing the first inlet and opening the second inlet when the weight of material in the receiver reaches a first level, whereby the vacuum thereafter draws material from the second container into the receiver; and
interrupting the vacuum when the weight of material in the receiver reaches a second level greater than said first level, whereby the flow of material to the receiver is terminated and the batch of material in the receiver is discharged through the outlet therein when the weight of material in the receiver reaches said second level.

9. In a vacuum sequencing system having a storage container for holding granular plastic material and the like, a receiver for receiving the material from the container and discharging the material in batches through an outlet of the receiver, a conduit extending from the container to the receiver to convey the material therebetween, a vacuum source for applying suction to the receiver to draw the material through said conduit from the container to the receiver, and a vacuum line extending from the vacuum source to the receiver to provide communication therebetween, the improvement comprising:
a vent opening in the receiver for venting same when open to permit discharge of the receiver contents;
a dump valve for controlling said vacuum line and vent opening, said dump valve having a first position wherein the vacuum line is open and the vent opening is closed and a second position wherein the vacuum line is closed and the vent opening is open;
a frame supporting the receiver in a manner permitting the receiver to deflect generally downwardly when material is loaded therein; and
control means operable to maintain said dump valve in the first condition when the downward deflection of the receiver is less than a predetermined level and to effect the second condition of the dump valve when the downward deflection of the receiver reaches said predetermined level, thereby discharging each batch of material through the outlet of the receiver when the weight of the batch is sufficient to effect said predetermined level of deflection of the receiver.

10. The improvement set forth in claim 9, including:
means for maintaining said dump valve in the second position until each batch of material has been fully discharged from the receiver; and
means for automatically effecting the first position of the dump valve when each batch of material has been fully discharged from the receiver, thereby initiating the loading of the next batch of material into the receiver.

* * * * *